United States Patent
Osaka et al.

(10) Patent No.: US 10,234,615 B2
(45) Date of Patent: Mar. 19, 2019

(54) ILLUMINATION DEVICE

(71) Applicant: Stanley Electric Co., Ltd., Tokyo (JP)

(72) Inventors: Kouichi Osaka, Tokyo (JP); Daisuke Nakashima, Tokyo (JP); Naoya Sone, Tokyo (JP); Norifumi Imazeki, Tokyo (JP); Mari Kawabata, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 156 days.

(21) Appl. No.: 15/049,981

(22) Filed: Feb. 22, 2016

(65) Prior Publication Data

US 2016/0245974 A1 Aug. 25, 2016

(30) Foreign Application Priority Data

Feb. 24, 2015 (JP) .................. 2015-033573

(51) Int. Cl.
| | |
|---|---|
| *F21S 43/245* | (2018.01) |
| *F21V 8/00* | (2006.01) |
| *F21S 43/239* | (2018.01) |
| *F21S 43/241* | (2018.01) |
| *F21S 43/243* | (2018.01) |
| *F21S 43/247* | (2018.01) |

(52) U.S. Cl.
CPC .......... *G02B 6/0018* (2013.01); *F21S 43/239* (2018.01); *F21S 43/241* (2018.01);
(Continued)

(58) Field of Classification Search
CPC .... F21S 48/215; F21S 48/2243; F21S 48/225; F21S 48/2268; F21S 48/2281;
(Continued)

(56) References Cited

U.S. PATENT DOCUMENTS

| 5,668,913 A | 9/1997 | Tai et al. |
| 6,097,549 A * | 8/2000 | Jenkins .................. B60Q 1/302 |
| | | 359/726 |

(Continued)

FOREIGN PATENT DOCUMENTS

| DE | 10 2005 047 793 A1 | 4/2007 |
| DE | 10 2008 056 985 A1 | 5/2010 |

(Continued)

OTHER PUBLICATIONS

The extended European search report for the related European Patent Application No. 16157022.1 dated Jul. 11, 2016.

*Primary Examiner* — Hargobind S Sawhney
(74) *Attorney, Agent, or Firm* — Kenealy Vaidya LLP

(57) ABSTRACT

An illumination device can include a light source; and a light guiding lens for receiving light from the light source. The light guiding lens includes a light emission portion that extends in a predetermined direction and has a main surface with reflecting cuts, and a light guiding portion provided to the light emission portion at an end portion thereof in the predetermined direction. The light guiding portion is configured to project more than the light emission portion in a thickness direction of the light emission portion and extend along the end portion of the light emission portion. The light source is disposed to face to an end face of the light guiding portion in an extending direction of the light guiding portion, the end face projecting more than the light emission portion. An end face of the light guiding portion has reflecting cuts arranged in the extending direction.

9 Claims, 3 Drawing Sheets

(52) U.S. Cl.
CPC ........... *F21S 43/243* (2018.01); *F21S 43/245* (2018.01); *F21S 43/247* (2018.01); *G02B 6/0021* (2013.01); *G02B 6/0043* (2013.01); *G02B 6/0045* (2013.01); *G02B 6/0073* (2013.01)

(58) Field of Classification Search
CPC ...... F21S 48/2287; F21S 48/24; F21S 43/241; F21S 43/245; F21S 43/247; F21V 5/002; F21V 7/0091; F21V 5/005; G02B 6/0018; G02B 6/0021; G02B 6/0031; G02B 6/0038; G02B 6/0043; G02B 6/0045; G02B 6/0016; G02B 6/002; G02B 6/0028; G02B 6/007; F21Y 2101/00; F21Y 2103/10
See application file for complete search history.

(56) References Cited

U.S. PATENT DOCUMENTS

| | | | | |
|---|---|---|---|---|
| 7,290,906 B2* | 11/2007 | Suzuki | ............... | B60Q 1/2696 362/328 |
| 9,242,594 B2* | 1/2016 | Nakada | ............... | G02B 6/002 |
| 9,328,885 B2* | 5/2016 | Ichikawa | ............... | F21S 48/00 |
| 9,732,928 B2* | 8/2017 | Akutsu | ............... | F21S 48/2268 |
| 2006/0171159 A1* | 8/2006 | Anderlini | ............... | B60Q 1/302 362/511 |
| 2010/0073954 A1* | 3/2010 | Gebauer | ............... | F21S 48/2243 362/551 |
| 2010/0246200 A1* | 9/2010 | Tessnow | ............... | F21S 48/2237 362/509 |
| 2014/0160778 A1* | 6/2014 | Nakada | ............... | G02B 6/002 362/511 |

FOREIGN PATENT DOCUMENTS

| | | |
|---|---|---|
| DE | 10 2014 005 044 A1 | 9/2014 |
| EP | 2 592 333 A2 | 5/2013 |
| JP | 2012-190761 A | 10/2012 |
| JP | 2012-190762 A | 10/2012 |
| JP | 2014-41787 A | 3/2014 |
| JP | 2014-157804 A | 8/2014 |
| JP | 2014-235819 A | 12/2014 |
| NO | 2015/002013 A1 | 1/2015 |

* cited by examiner

ILLUMINATION DEVICE

This application claims the priority benefit under 35 U.S.C. § 119 of Japanese Patent Application No. 2015-033573 filed on Feb. 24, 2015, which is hereby incorporated in its entirety by reference.

TECHNICAL FIELD

The presently disclosed subject matter relates to illumination devices, and, in particular, to an illumination device including a light guiding lens that is capable of emitting light along its surface.

BACKGROUND ART

There are known conventional illumination devices, such as vehicle lighting fixtures, that include a light guiding lens that is capable of emitting light along its surface.

Japanese Patent Application Laid-Open No. 2014-041787 describes this type of illumination device. The disclosed illumination device includes a plate-shaped light guiding lens having a rod-shaped light guiding portion extending along the light guiding lens at one end side. The light guiding portion is integrally provided to the light guiding lens. The illumination device further includes a light source, such as a light emitting diode, disposed to face to one end face of the light guiding portion. With this configuration, light emitted from the light source can be incident on the end face to enter the light guiding portion, and be guided thereinside to enter the plate-shaped light guiding lens, thereby allowing the main surface of the light guiding lens to project light.

Since the rod-shaped light guiding portion is integrally connected to the light guiding lens that serves as a light emission portion, the light that is emitted from the light source and just enters the light guiding portion through the end face is likely to directly enter the light guiding lens near the end face. This prevents the light from being sufficiently guided to the opposite end of the light guiding portion, resulting in luminance unevenness.

Japanese Patent Application Laid-Open No. 2014-157804 discloses an illumination device including a light guiding lens with a light guiding portion where there is a gap (air layer) provided between the light guiding portion and the light guiding lens. This can facilitate the light guiding to the opposite tip end of the light guiding portion to suppress the luminance unevenness of the light guiding lens.

However, in this case where there is a gap provided between the light guiding portion and the light guiding lens (serving as a light emission portion), luminous flux may be lost (luminous flux loss) when the light from the light guiding portion enters the light guiding lens via the air gap. Thus, the luminous flux utilization efficiency may deteriorate.

SUMMARY

The presently disclosed subject matter was devised in view of these and other problems and features in association with the conventional art. According to an aspect of the presently disclosed subject matter, an illumination device can prevent the deterioration of the luminous flux utilization efficiency and suppress the luminance unevenness while the light guiding lens can project light along its surface.

According to another aspect of the presently disclosed subject matter, an illumination device can include a first light source and a light guiding lens configured to receive light emitted from the first light source and guide the light to project light. The light guiding lens can include a first light emission portion in a plate shape that extends in a predetermined direction and has a main surface with a plurality of reflecting cuts formed therein, and a first light guiding portion provided to the first light emission portion at an end portion thereof in the predetermined direction. The first light guiding portion can be configured to project more than the first light emission portion in a thickness direction of the first light emission portion and extend along the end portion of the first light emission portion. The first light source can be disposed to face to a portion of an end face of the first light guiding portion in an extending direction in which the first light guiding portion extends, the portion of the end face projecting more than the first light emission portion in the extending direction. A portion of an end face of the first light guiding portion in the predetermined direction disposed at a position in the predetermined direction of the first light emission portion can have a plurality of reflecting cuts arranged side by side in the extending direction.

According to still another aspect of the presently disclosed subject matter, the illumination device of the previous aspect can be configured such that the first light guiding portion can be configured to project only on a side of the main surface of the first light emission portion in the thickness direction.

According to still another aspect of the presently disclosed subject matter, the illumination device of any of the previous aspects can be configured such that the light guiding lens can be configured to include a second light emission portion in a plate shape that extends in the predetermined direction and have a main surface with a plurality of reflecting cuts formed therein. The second light emission portion can be configured to bend and be inclined to a side where the first light guiding portion projects with respect to the first light emission portion so as to extend along the other end portion of the first light emission portion in the extending direction and be connected to the other end portion. The first light guiding portion can be configured to include the other end portion in the extending direction to be connected to the second light emission portion. The other end face of the first light guiding portion can include a reflecting face that can internally reflect light, which has been guided through the first light guiding portion in the extending direction, in the predetermined direction toward the second light emission portion.

According to still another aspect of the presently disclosed subject matter, the illumination device of the previous aspect can be configured such that the light guiding lens can include a third light emission portion in a plate shape that extends in the predetermined direction and has a main surface with a plurality of reflecting cuts formed therein, and a second light guiding portion provided to the third light emission portion at an end portion of the third light emission portion in the predetermined direction. The third light emission portion can be connected to an end portion of the second light emission portion opposite to the end portion thereof where the first light emission portion is connected so as to be inclined with respect to the second light emission portion and extend along the end portion. The second light guiding portion can be configured to project more than the third light emission portion in a thickness direction of the third light emission portion and extend along the end portion of the third light emission portion. The illumination device can include a second light source disposed to face to the second light guiding portion at one end face in an extending direction in which the second light guiding portion extends, the one end face being located on a side opposite to the side where the second light emission portion is connected, the one end face projecting more than the third light emission portion. A portion of an end face in the predetermined direction disposed at a position in the predetermined direction of the third light emission portion can have a plurality of reflecting cuts arranged side by side in the extending direction of the second light guiding portion.

According to still another aspect of the presently disclosed subject matter, the illumination device of the previous aspect can be configured such that the second light guiding portion can be connected to the second light emission portion at the other end portion thereof in the extending direction, and the other end face of the second light guiding portion can be overlapped with the reflecting face of the first light guiding portion.

With the above-described configuration, the light emitted from the first light source can enter the first light guiding portion through the end face of the first light guiding portion extending along the end portion of the first plate-shaped light emission portion, the end face projecting in the thickness direction of the first light emission portion more than the first light emission portion. The light be allowed to be incident on the portion of the first light guiding portion projecting more than the first light emission portion. Therefore, the light can be prevented from directly entering the first light emission portion connected to the first light guiding portion, and thus appropriately guided to the other tip end side through the projecting portion (a side away from the first light source).

Furthermore, the light guided through the first light guiding portion can be internally reflected by the plurality of reflecting cuts formed in the first light guiding portion disposed at the position in the predetermined direction of the first light emission portion so as to enter the first light emission portion.

The resulting light can be internally reflected by the plurality of reflecting cuts formed in the one main surface of the first light emission portion so as to exit through another main surface of the first light emission portion. This can illuminate the other main surface of the first light emission portion with light.

Accordingly, when compared with the conventional illumination device in which there is a gap between a light guiding portion and a light emission portion, the presently disclosed subject matter can prevent the luminous flux utilization efficiency from deteriorating. In addition, since the light can be guided properly and appropriately to the tip end of the light guiding portion, the luminance unevenness of the light guiding lens can be suppressed.

As a result, the illumination device can prevent the deterioration of the luminous flux utilization efficiency and suppress the luminance unevenness while the light guiding lens can project light along its surface uniformly.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights of the presently disclosed subject matter with reference to the accompanying drawings in accordance with exemplary embodiments.

Figure 1:
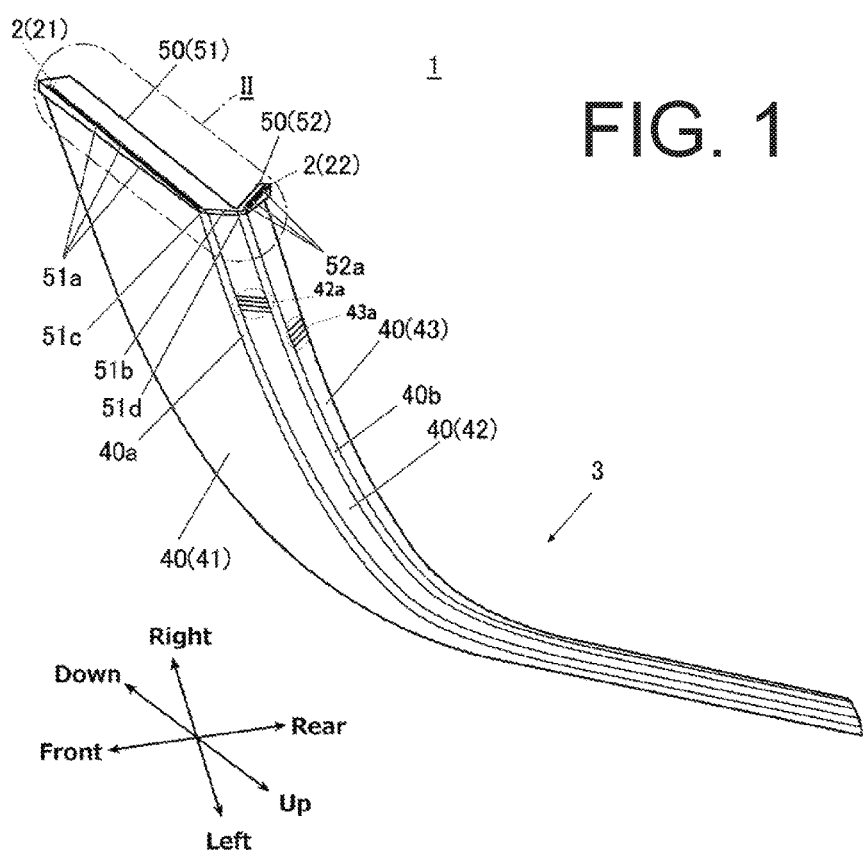
FIG. 1 is a perspective view of essential components of an illumination device made in accordance with principles of the presently disclosed subject matter.
Figure 2:
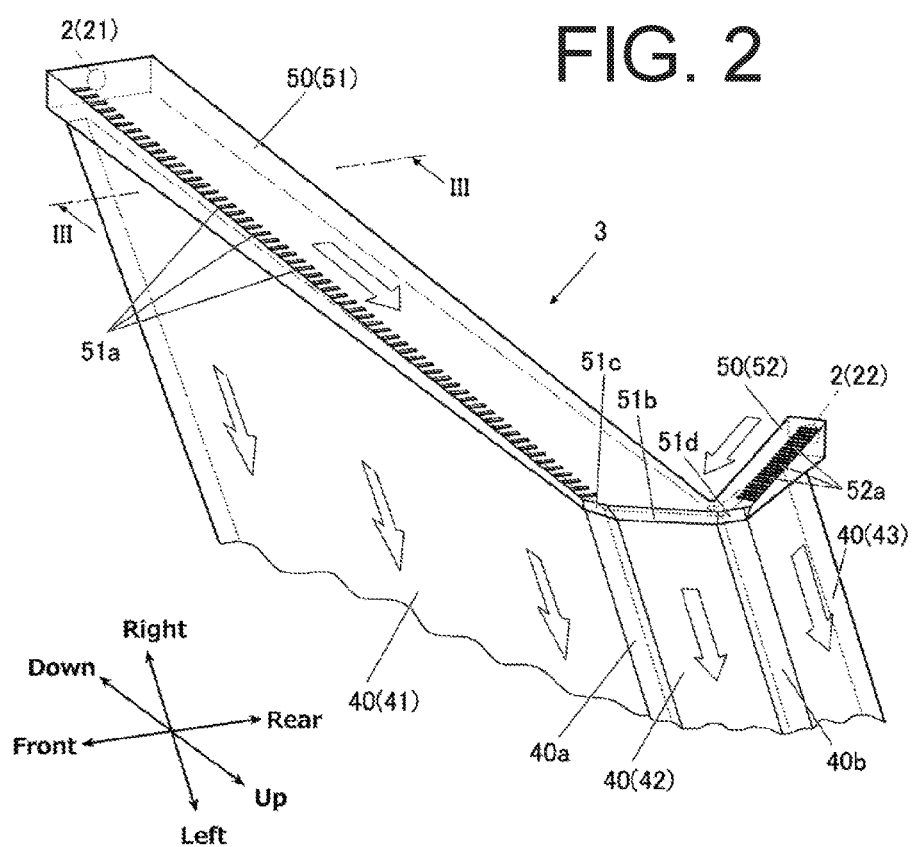
FIG. 2 is an enlarged view of a part II in FIG. 1.

FIG. 1 is a perspective view of essential components of an illumination device 1 made in accordance with the principles of the presently disclosed subject matter. FIG. 2 is an enlarged view of a part II in FIG. 1, and FIG. 3 is a cross-sectional view illustrating the illumination device 1 taken along line III-III of FIG. 2.

Figure 3:
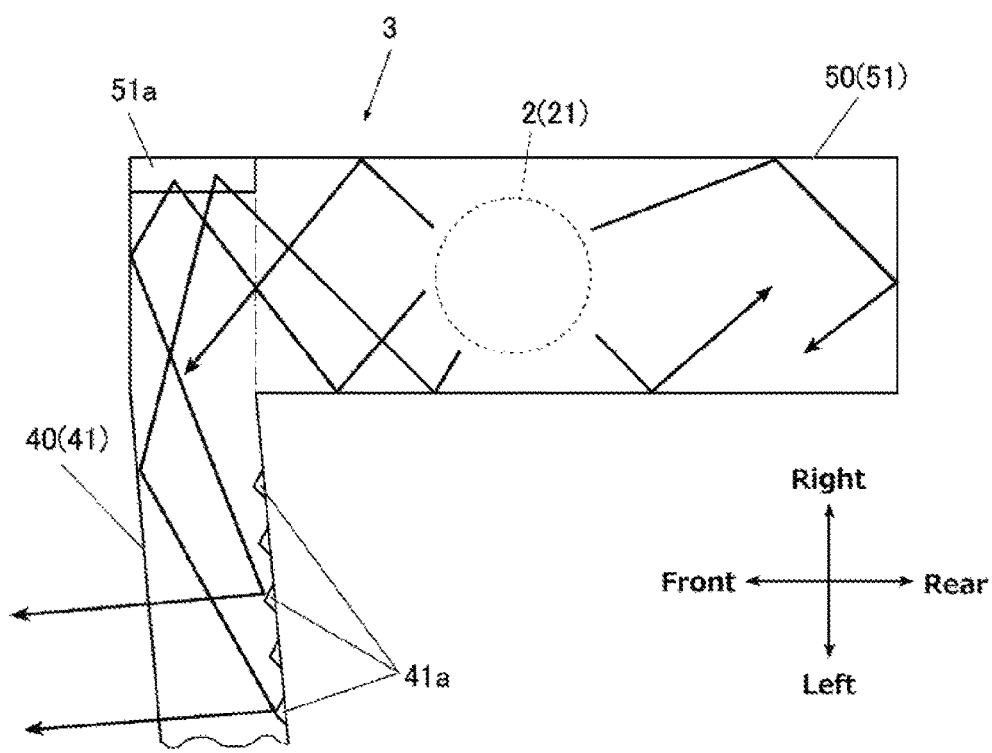
FIG. 3 is a cross-sectional view illustrating the illumination device taken along line III-III of FIG. 2.

As illustrated in FIGS. 1 to 3, the illumination device 1 can be configured to illuminate a region across the front area to the sideward area (leftward area in the illustrated example). The illumination device 1 can include two light sources such as two light emitting diodes 2 (first and second LEDs 21 and 22), and a light guiding lens 3 configured to guide light from the LEDs 2 while being illuminated with the light (projecting the light).

The light guiding lens 3 can be configured to include three light emission portions 40 and two light guiding portions 50. In particular, the three light emission portion 40 can include a first light emission portion 41, a second light emission portion 42, and a third light emission portion 43, and the two light guiding portions 50 can include a first light guiding portion 51 and a second light guiding portion 52 that can individually guide light rays emitted from the respective LEDs 2 to three light emission portions 40.

The first light emission portion 41 can be a main light emission portion of the light guiding lens 3, and can be formed in an elongated, curved plate shape extending along a left-right direction when viewed from its front side. The first light emission portion 41 can have a front main face extending from the front end to the rear end and facing forward to leftward along its extending direction. The first light emission portion 41 can have a rear main face in which a plurality of reflecting cuts 41a can be formed substantially entirely.

The third emission portion 43 can be formed in an elongated, curved plate shape having a width narrower than that of the first light emission portion 41. The third emission portion 43 can be provided along a direction in which the first emission portion 41 extends and have an upper main face facing upward and obliquely rearward. More specifically, the third light emission portion 43 can be connected to the upper end of the first light emission portion 41 via the second light emission portion 42 so as to project rearward from the upper end of the first light emission portion 41 via the second light emission portion 42 along the entire length of the first light emission portion 41. The third light emission portion 43 can have a lower main face in which a plurality of reflecting cuts 43a (illustrated in part in FIG. 1 only at an encircled region when see through the upper face) that are similar to those of the first light emission portion 41 can be formed substantially entirely.

The second light emission portion 42 can be formed in an elongated, curved plate shape similar to the third light emission portion 43. The second light emission portion 42 can be provided along the first emission portion 41 and have a front main face facing obliquely upward. Specifically, the second light emission portion 42 can be configured to connect the upper end portion of the first light emission portion 41 and the front end portion of the third light emission portion 43 along the entire length thereof like a chamfered shape therebetween. More specifically, the second light emission portion 42 can be configured to be bent rearward with respect to the first light emission portion 41 and be bent downward with respect to the third light emission portion 43, and to be connected to the upper end portion of the first light emission portion 41 and the front end portion of the third light emission portion 43 extending therealong. The second light emission portion 42 can have a rear main face in which a plurality of reflecting cuts 42a (illustrated in part in FIG. 1 only at an encircled region when see through the front face) that are similar to those of the first light emission portion 41 can be formed substantially entirely.

Furthermore, the first light emission portion 41 and the second light emission portion 42 can have a connected face 40a formed therebetween and the second light emission portion 42 and the third light emission portion 43 can have a connected face 40b formed therebetween. The connected faces 40a and 40b can be formed along the entire lengths in a chamfered shape as illustrated in the enlarged view of FIG. 2.

The first light guiding portion 51 can receive and guide the light from the first LED 21 mainly to the first light emission portion 41 and partly to the second light emission portion 42 for illumination.

Specifically, the first light guiding portion 51 can be provided along the right end portion of the first light emission portion 41 so as to extend vertically. The first light guiding portion 51 can have a rectangular cross section in a plane extending in the front-rear direction and perpendicular to the extending direction (vertical direction). The first light guiding portion 51 can have a front face flush with the first light emission portion 41 and a rear portion projected rearward than the fight end portion of the first light emission portion 41. However, the first light guiding portion 51 may be projected forward or both rearward and forward as long as the first light guiding portion 51 projects in the thickness direction of the first light emission portion 41 (in the illustrated example, projecting in the front-rear direction at the right end portion). Then, the first light guiding portion 51 can be formed to have a narrower width in the left-right direction toward its upper end side.

The first light guiding portion 51 can have a lower end portion projected slightly downward more than the first light emission portion 41. The first LED 21 can be disposed to face to a portion of the first light guiding portion 51 projected rearward more than the first light emission portion 41. In the illustrated example, the first LED 21 can be disposed at the middle of the lower end portion of the first light guiding portion 51 in the front-rear direction.

The first light guiding portion 51 can have a plurality of reflecting cuts 51a at its right end face that is rightward with respect to the right end portion of the first light emission portion 41. The reflecting cuts 51a can be formed side by side along the direction in which the first light guiding portion 51 extends (vertical direction).

The first light guiding portion 51 can be formed to be slightly longer than the second light emission portion 42 in the front-rear direction, and have an upper end portion connected to the second light emission portion 42. Here, the first light guiding portion 51 can have an inclined face 51b projected rearward than the first light emission portion 41 and inclined in a chamfered shape. The inclined face 51b can be located on the right side of the second light emission portion 43 so as to internally reflect the light guided upward through the first light guiding portion 51 toward the second light emission portion 42 (leftward in the drawing).

The first light guiding portion 51 can have a chamfered inclined face 51c that is an upper end face of the first light guiding portion 51 located above the right end portion of the first light emission portion 41 or located above the plurality of reflecting cuts 51a. The inclined face 51c located on the right side of the connected face 40a can internally reflect the light, which has been guided upward through the first light guiding portion 51, leftward.

On the other hand, the second light guiding portion 52 can be configured to guide the light from the second LED 22 to the third light emission portion 43 and in part to the second light emission portion 42 to irradiate them with light.

Specifically, the second light guiding portion 52 can be configured similarly to the first light guiding portion 51 except for its size, and to be provided to the right end portion of the third light emission portion 43 so as to extend long along the right end portion of the third light emission portion 43. The second light guiding portion 52 can be formed to have a rectangular cross section perpendicular to its extending direction and an upper face approximately flushing with the third emission portion 43 and projecting downward more than the right end portion of the third light emission portion 42. Note that the second light guiding portion 52 may project in the thickness direction of the third light emission portion 43 (approximately vertically at its right end portion). The second light guiding portion 52 can be formed to have a left-right width narrower toward its front side.

The second light guiding portion 52 can have a rear end portion projecting slightly rearward more than the third light emission portion 43, and there can be disposed the second LED 22 at a portion projecting downward more than the third light emission portion 43 on its rear end face of the second light guiding portion 52.

The second light guiding portion 52 can have a plurality of reflecting cuts 52a at its right end face that is rightward with respect to the right end portion of the third light emission portion 43. The reflecting cuts 52a can be formed side by side along the direction in which the second light guiding portion 52 extends.

The second light guiding portion 52 can have a front end portion connected to the upper end portion of the first light guiding portion 51 and also to the second light emission portion 42.

The second light guiding portion 52 can have a front end face of which a portion projecting downward more than the third light emission portion 43 can be overlapped with the upper portion of the inclined face 51b. With this configuration, the light that has been guided through the second light guiding portion 52 forward can be internally reflected by the upper portion of the inclined face 51b leftward toward the second light emission portion 42.

The second light guiding portion 52 can have an inclined face 51d disposed in front of the right end portion of the third light emission portion 43 (forward of the third light emission portion 43 along its extending direction), or a portion disposed forward of the plurality of reflecting cuts of the third light emission portion 43. The inclined face 51d located on the right side of the connected face 40b can internally reflect the light, which has been guided forward through the second light guiding portion 52, leftward.

As described above, the illumination device 1 of the presently disclosed subject matter can be configured such that the light emitted from the first LED 21 can enter the first light guiding portion 51 through the lower end face of the first light guiding portion 51, which can extend vertically along the right end portion of the plate-shaped first light emission portion 41, at the portion of the lower end face projecting more than the first light emission portion 41 in its thickness direction (front-rear direction). Since the light can be incident on the projecting portion of the first light guiding portion 51 more than the first light emission portion 41, the light does not enter straightforwardly the first light emission portion 41 connected to the first light guiding portion 51, but the light can be appropriately guided through the first light guiding portion 51 partly up to the upper end side (farther side from the first LED 21) through the projection portion of the first light guiding portion 51.

The light guided through the first light guiding portion 51 can be internally reflected by the plurality of reflecting cuts 51a formed at right end face of the first light guiding portion 51 in portions on the right side of the first light emission portion 41, so as to enter the first light emission portion 41.

Then, the light can be internally reflected by the plurality of reflecting cuts 41a formed on the rear face of the first light emission portion 41 to exit through the front face of the first light emission portion 41. As a result, the front face of the first light emission portion 41 can be illuminated with light, or the light can be projected through the front face.

Accordingly, when compared with the conventional illumination device in which there is a gap between a light guiding portion and a light emission portion, the illumination device 1 made in accordance with the principles of the presently disclosed subject matter can prevent the luminous flux utilization efficiency from deteriorating. In addition, since the light can be guided properly and appropriately to the upper end side of the first light guiding portion 51, the luminance unevenness of the light guiding lens 3 can be suppressed. As a result, the illumination device 1 can prevent the deterioration of the luminous flux utilization efficiency and suppress the luminance unevenness while the light guiding lens 3 can project light along its surface uniformly.

The light guiding lens 3 can include the second light emission portion 42 that is connected to the first light emission portion 41 along the upper end portion of the first light emission portion 41 while being inclined with respect to the first light emission portion 41. Furthermore, the first light guiding portion 51 can be connected to the second light emission portion 42 at its upper end portion, and can have the inclined face 51b at its upper end face, with the inclined face 51b configured to internally reflect the light guided upward through the first light guiding portion Si leftward to the second light emission portion 42. With this configuration, the light guided through the first light guiding portion 51 up to the upper end side can be utilized to illuminate the second light emission portion 42.

In this manner, the light from the first LED 21 can be projected through both surfaces of the first light emission portion 41 and the second light emission portion 42, thereby achieving a three-dimensional surface emission system.

Furthermore, the light guiding lens 3 can include the third light emission portion 43 and the second light guiding portion 52 similar to the first light emission portion 41 and the first light guiding portion 51. Therefore, as in the first light emission portion 41, the third light emission portion 43 can project light along its surface uniformly, thereby also achieving a three-dimensional surface emission system.

In this manner, the first light emission portion 41, the third light emission portion 43, and the second light emission portion 42 between them can project light along their surfaces uniformly, thereby achieving a three-dimensional surface emission system with providing a higher aesthetic appearance.

Embodiments to which the presently disclosed subject matter applicable are not limited to the above-described exemplary embodiment, and can be appropriately modified within the scope of the presently disclosed subject matter.

For example, only the first LED 21 as a single LED is disposed to face to the portion of the lower end face of the first light guiding portion 51 projecting rearward more than the first light emission portion 41, but this is not restrictive. For example, a plurality of LEDs can be disposed to face to the lower end face of the first light guiding portion 51 projecting rearward. The same configuration can be applied to the second light guiding portion 52 and a plurality of LEDs instead of the second LED 22. This configuration can increase the light amount to illuminate the light emission portion 40 with.

A part of or entire surface of each of the light guiding portions 51 and 52 may be subjected to aluminum deposition to decrease the light leakage from the light guiding portions 51 and 52. In another mode, a reflecting plate may be disposed on the right side of the respective light guiding portions 51 and 52 to reflect leaked light to re-enter the light guiding portions 51 and 52.

The direction (posture) of the illumination device is not limited to that illustrated in the drawings. Furthermore, the illumination device made in accordance with the principles of the presently disclosed subject matter may serve as other vehicle lighting fixtures such as a rear combination lamp, a turn signal lamp, a day-time running lamp, etc. Therefore, the position and direction (posture) of the illumination device may appropriately be determined in accordance with the product to which the illumination device is installed.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An illumination device comprising:
   a first light source for emitting light towards a first light emission direction; and
   a light guiding lens for receiving the light from the first light source and guiding the light to propagate light within the light guiding lens and output the light in a second output direction different from the first light emission direction, wherein
   the light guiding lens includes,
      a first light guiding portion located adjacent the first light source, the first light guiding portion having a longitudinal axis extending along the light emission direction away from the first light source from a front end portion of the first light guiding portion that faces the first light source to a second end portion of the first light guiding portion,
      a first light emission portion having a plate shape and a longitudinal axis extending downward away from a front edge of the first light guiding portion such that light that travels along the longitudinal axis of the first light guiding portion is transferred to the first light emission portion via the front edge of the first light guiding portion to travel along the longitudinal axis of the first light emission portion, and a second light emission portion having a plate shape and located adjacent the first light emission portion, the second light emission portion having a longitudinal axis extending downward away from the second end portion of the first light guiding portion such that light that travels along the longitudinal axis of the first light guiding portion is transferred to a top front edge of the second light emission portion via the second end portion of the first light guiding portion, wherein the first light emission portion has a main front surface, and a main rear surface having a plurality of reflecting cuts formed therein to reflect the propagated light into the second output direction, and a front end portion on a light-entering side of the first light emission portion, wherein the first light guiding portion is located adjacent to the front end portion of the first light emission portion, the first light guiding portion extending along the longitudinal axis of the first light guiding portion a greater distance than a distance that the front end portion of the first light emission portion extends in a direction of the longitudinal axis of the first light guiding portion such that the front end portion of the first light guiding portion has an end face located close to the first light source and the front end portion of the first light guiding portion projects from the first light emission portion to a position closer to the first light source than the first light emission portion along the first light emission direction, wherein the front edge of the first light guiding portion is located adjacent to the front end portion of the first light emission portion and has a plurality of reflecting cuts arranged side by side along the first light emission direction, the first light guiding portion projects in a direction away from the main rear surface of the first light emission portion in a direction opposed to the second light output direction, the second light emission portion has a main front surface, and a main rear surface with a plurality of reflecting cuts formed therein, the second light emission portion bends along the longitudinal axis of the second light emission portion, and the top front edge of the second light emission portion has a longitudinal axis that is inclined with respect to the longitudinal axis of the first light guiding portion, and the second end portion of the first light guiding portion includes a reflecting face that internally reflects light, which has been guided through the first light guiding portion in the first light emission direction, in a third direction toward the second light emission portion.

2. The illumination device according to claim 1, wherein the light guiding lens includes a third light emission portion in a plate shape that extends in the third direction and has a main front surface, a main rear surface with a plurality of reflecting cuts formed therein, and a light-entering front end portion on a light-entering side, and a second light guiding portion located adjacent the front end portion of the third light emission portion, the third light emission portion is connected to the second light emission portion on a first side of the second light emission portion that is opposed to a second side of the second light emission portion to which the first light emission portion is connected, and the light entering front end portion of the third emission portion extends along a front end longitudinal axis that is inclined with respect to the longitudinal axis of the top front edge of the second light emission portion, the illumination device includes a second light source disposed adjacent to and facing the second light guiding portion at one end face of the second light guiding portion, the one end face projecting towards the second light source from a side of the third light emission portion, the second light guiding portion has a downward facing face located adjacent to the light-entering front end portion of the third light emission portion, and a portion of the downward facing face at a position corresponding to the light-entering front end portion of the third light emission portion has a plurality of reflecting cuts arranged side by side along a longitudinal axis direction of the second light guiding portion.

3. The illumination device according to claim 2, wherein the second light guiding portion is connected to the second light emission portion at an other end portion of the second light guiding portion opposite to the end face of the second light guiding portion, and the other end portion of the second light guiding portion overlaps with the reflecting face of the first light guiding portion.

4. An illumination device comprising:

a first light source for emitting light towards a first light emission direction; and a light guiding lens for receiving the light from the first light source and guiding the light to propagate light within the light guiding lens and output the light in a second output direction different from the first light emission direction, wherein the light guiding lens includes a first light guiding portion located adjacent the first light source, the first light guiding portion having a longitudinal axis extending along the light emission direction away from the first light source from a front end portion of the first light guiding portion that faces the first light source to a second end portion of the first light guiding portion, a first light emission portion having a plate shape and a longitudinal axis extending downward away from a front edge of the first light guiding portion such that light that travels along the longitudinal axis of the first light guiding portion is transferred to the first light emission portion via the front edge of the first light guiding portion to travel along the longitudinal axis of the first light emission portion, and a second light emission portion having a plate shape and located adjacent the first light emission portion, the second light emission portion having a longitudinal axis extending downward away from the second end portion of the first light guiding portion such that light that travels along the longitudinal axis of the first light guiding portion is transferred to a top front edge of the second light emission portion via the second end portion of the first light guiding portion, wherein the first light emission portion has a main front surface, and a main rear surface having a plurality of reflecting cuts formed therein to reflect the propagated light into the second output direction and a front end portion on a light-entering side of the first light emission portion, wherein the first light guiding portion is located adjacent to the first light emission portion, the first light guiding portion extending along the longitudinal axis of the first light guiding portion a greater distance than a distance that the front end portion of the first light emission portion extends in a direction of the longitudinal axis of the first light guiding portion such that the front end portion of the first light guiding portion has an end face located close to the first light source and, the front end portion of the first light guiding portion projects from the first light emission portion to a position closer to the first light source than the first light emission portion along the first light emission direction, wherein the front edge of the first light guiding portion is located adjacent to the front end portion of the first light emission portion and has a plurality of reflecting cuts arranged side by side along the first light emission direction, the second light emission portion has a main front surface, and main rear surface with a plurality of reflecting cuts formed therein, the second light emission portion bends along the longitudinal axis of the second light emission portion, and the top front edge of the second light emission portion has a longitudinal axis that is inclined with respect to the longitudinal axis of the first light guiding portion, the second end portion of the first light guiding portion includes a reflecting face that internally reflects light, which has been guided through the first light guiding portion in the first light emission direction, in a third direction toward the second light emission portion.

5. The illumination device according to claim 4, wherein the light guiding lens includes a third light emission portion in a plate shape that extends in the third direction and has a main front surface, a main rear surface with a plurality of reflecting cuts formed therein, and a light-entering front end portion on a light-entering side, and a second light guiding portion located adjacent the front end portion of the third light emission portion, the third light emission portion is connected to the second light emission portion on a first side of the second light emission portion that is opposed to a second side of the second light emission portion to which the first light emission portion is connected, and the light entering front end portion of the third emission portion extends along a front end longitudinal axis that is inclined with respect to the longitudinal axis of the top front edge of the second light emission portion, the illumination device includes a second light source disposed adjacent to and facing the second light guiding portion at one end face of the second light guiding portion, the one end face projecting towards the second light source from a side of the third light emission portion, the second light guiding portion has a downward facing face located adjacent to the light-entering front end portion of the third light emission portion, and a portion of the downward facing face at a position corresponding to the light-entering front end portion of the third light emission portion has a plurality of reflecting cuts arranged side by side along a longitudinal axis direction of the second light guiding portion.

6. The illumination device according to claim 5, wherein the second light guiding portion is connected to the second light emission portion at an other end portion of the second light guiding portion opposite to the one end face of the second light guiding portion, and the other end portion of the second light guiding portion overlaps with the reflecting face of the first light guiding portion.

7. The illumination device according to claim 6, wherein the first light guiding portion projects only from the main rear surface of the first light emission portion.

8. The illumination device according to claim 5, wherein the first light guiding portion projects only from the main rear surface of the first light emission portion.

9. The illumination device according to claim 4, wherein the first light guiding portion projects only from the main rear surface of the first light emission portion.

* * * * *